(12) United States Patent
Shelton et al.

(10) Patent No.: US 7,020,052 B2
(45) Date of Patent: Mar. 28, 2006

(54) SYSTEM AND METHOD FOR A HIGH BANDWIDTH SERVO SYSTEM

(75) Inventors: Boyd Shelton, N. Ogden, UT (US); Charlie M. Monroe, Jr., Longmont, CO (US)

(73) Assignee: Iomega Corporation, San Diego, CA (US)

( * ) Notice: Subject to any disclaimer, the term of this patent is extended or adjusted under 35 U.S.C. 154(b) by 720 days.

(21) Appl. No.: 09/943,102

(22) Filed: Aug. 30, 2001

(65) Prior Publication Data
US 2003/0043710 A1 Mar. 6, 2003

(51) Int. Cl.
*G11B 20/10* (2006.01)

(52) U.S. Cl. .............................. 369/44.26; 369/44.29; 369/44.35

(58) Field of Classification Search .............. 369/44.11, 369/44.17, 44.26, 44.34, 275.3, 44.28; 360/48, 360/49, 60, 75, 77.08, 78.04, 78.14
See application file for complete search history.

(56) References Cited

U.S. PATENT DOCUMENTS

| 4,825,310 | A | * | 4/1989 | Song ........................ 360/77.08 |
| 4,985,616 | A |   | 1/1991 | Nakamura et al. .......... 235/494 |
| 5,065,382 | A | * | 11/1991 | Seko et al. .............. 360/77.08 |
| 5,210,660 | A | * | 5/1993 | Hetzler .................... 360/77.08 |
| 5,268,803 | A | * | 12/1993 | Sugita et al. ............. 369/44.26 |
| 5,295,131 | A |   | 3/1994 | Ishibashi et al. ......... 369/275.3 |
| 5,339,207 | A | * | 8/1994 | Moon et al. .............. 360/77.05 |
| 5,442,499 | A |   | 8/1995 | Emori ...................... 360/77.08 |
| 5,724,330 | A | * | 3/1998 | Kobayashi et al. ........ 369/59.2 |
| 5,748,582 | A | * | 5/1998 | Kobayashi et al. ...... 369/44.26 |
| 5,815,485 | A | * | 9/1998 | Tanaka et al. ........... 369/275.3 |
| 5,818,805 | A | * | 10/1998 | Kobayashi et al. ...... 369/47.32 |
| 5,894,463 | A | * | 4/1999 | Okawa et al. ........... 369/44.35 |
| 5,959,797 | A | * | 9/1999 | Imai et al. ..................... 360/51 |
| 6,021,012 | A |   | 2/2000 | Bang ........................... 360/51 |
| 6,259,577 | B1 | * | 7/2001 | Ahn ........................ 360/78.14 |
| 6,349,079 | B1 | * | 2/2002 | Belser et al. ............. 369/44.26 |
| 6,388,829 | B1 | * | 5/2002 | Nazarian ..................... 360/48 |
| 6,504,664 | B1 | * | 1/2003 | Zook ........................... 360/51 |
| 6,775,081 | B1 | * | 8/2004 | Ottesen et al. ................ 360/48 |

OTHER PUBLICATIONS

"Recorded optical media unit for digital information interchange-130 mm write-once sampled-servo RZ selectable-pitch optical disk cartridge", *American National Standards Institute*, X3.191-1991.

"90-mm(3.54-in) Optical disk cartridge reriteable and read only using discrete block format (DBF) method for digital information interchange", *American National Standards Institute*, X3.213-1994.

"130-mm Write-once optical disk cartridge using sampled servo and 4/15 encoding", *American National Standards Institute*, X3.214-1992.

* cited by examiner

*Primary Examiner*—Tan Dinh
(74) *Attorney, Agent, or Firm*—James T. Hagler

(57) ABSTRACT

A storage medium is provided having a relatively large number of relatively small servo sectors. The storage medium includes a plurality of tracks. Each track includes a plurality of data sectors and a plurality of servo sectors. Each servo sector includes a plurality of servo marks and a synchronization gap. A plurality of first servo sectors includes a synchronization gap having a first length and a plurality of second servo sectors includes a synchronization gap having a second length. The first length is different from the second length, whereby, an unsynchronized reading device may recognize the longer synchronization gap and synchronize to the servo sector and a synchronized reading device may remain synchronized by recognizing the shorter synchronization gap.

5 Claims, 7 Drawing Sheets

SYSTEM AND METHOD FOR A HIGH BANDWIDTH SERVO SYSTEM

FIELD OF THE INVENTION

The present invention generally relates to the field of storage media, more particularly, the present invention relates to a servo sector format for a high bandwidth servo system and a system and method for using the servo sector format.

BACKGROUND OF THE INVENTION

A storage medium stores data for use by an electronic device having a reading device. Common examples of storage media include floppy disks, optical disks, hard disks, and the like. Common examples of a reading device are a floppy disk drive, a hard disk drive, and the like. A typical storage medium may be formatted to contain thousands of "tracks" of information, organized as concentric rings on the storage medium surface. These tracks must be precisely followed by the electronics of the reading device during reading and writing of data to/from the storage medium surface. If the tracks are not precisely followed with appropriate position and clocking speed, data may be erroneously read. Information is typically encoded on the storage medium to facilitate proper tracking. Various information formats have been employed; however, as storage density increases, existing formats become less practical.

As background on these formats, in a typical track following technique, for an optical storage medium, the medium contains data tracks as well as land and grooves marks which provides continuous tracking information to the electronics of the reading device. A first sensor reads the data tracks and a second sensor reads the land and groove marks. The land and groove marks are used by the electronic device to maintain the proper clocking speed and position of the reading device, thereby allowing the device to accurately read data from the storage medium (i.e., with minimal read and/or write errors).

In a typical track following technique, for a magnetic storage medium, the electronics of the reading device follows the tracks via servo sectors in a single track, embedded at intervals in the data, around the track (typically referred to as embedded servo). As such, the storage medium includes both data sectors and servo sectors, both of which may be read by a single read head. The data sector is used to store data marks and the servo sector is used to store servo marks. Servo marks are used by the electronic device to maintain the proper circumferential timing information and position of the reading device, thereby allowing the device to accurately read data from the storage medium (i.e., with minimal read and/or write errors).

Applying the embedded servo technique that is typically used for magnetic storage medium to an optical storage medium (which typically has a higher storage density), provides several design challenges. This is especially desired in a near field optical storage medium where there is no way to discriminate data patterns from the diffraction patterns from a land or groove that is commonly used in an optical storage medium. First, a straightforward application of known servo marks to an optical storage medium creates a large amount of servo overhead. That is, the ratio of servo mark area to data mark area may become unacceptable, as described in more detail below.

As background on the servo marks, in a typical magnetic storage medium, servo marks occur 60 to 150 times per revolution taking 4 to 12% of the total disk storage area. In a high track optical drive, which has a 1 to 3 KHz bandwidth servo, a sample rate of 10 to 30 KHz is used, which in turn uses 200 to 1000 servo samples per revolution. In such a system, servo marks would occupy 12 to 50% of the total disk storage space. This is an undesirable and sometimes unacceptable amount of servo overhead.

Further, in magnetic storage media today, a new data synchronization field occurs after every servo mark and increases servo mark overhead. If more servo marks are added to increase the servo bandwidth the re-synchronization field overhead is even worse.

In optical storage, wobble marks may be used by a reading device to remain aligned with a data track of a storage medium. Wobble marks are typically located offset from the center line of a data track. Typically, one wobble mark is located on one side of the center line of a data track and another wobble mark is located on the other side of the center line of the data track. The reading device receives a signal by reading the wobble marks and adjusts the position of the reading device according to the signal. If the reading device becomes mis-aligned with the data track, then the reading device may begin to incorrectly read the data marks. Additional wobble marks may be located on the track center line of a data track to provide additional information to the reading device. Conventional magnetic servo mark formats include both types of wobble/servo marks in one servo sector. However, including both types of wobble marks in one servo sector increases the size of the servo sector. Moreover, some conventional magnetic servo mark formats include multiple wobble marks in one servo sector, which are averaged. This technique, while providing some benefit, may create an unacceptable amount of servo overhead in a high density storage medium.

Greycodes are used by a reading device to determine a track number in a magnetic storage medium. A servo mark on each track may include a plurality of bits representing the track number of that particular track. In that manner, the reading device can determine its radial position relative to the storage medium without having to return to a known position (e.g., the zero track). This can reduce recovery time if the reading device loses track of its radial position. Conventional greycodes have a specific field within the servo sector dedicated to the greycode. However, this dedicated field increases the size of the servo sector and if applied to a high sample rate, high density storage device, may increase servo overhead to an unacceptable level.

Reset/servo sync marks indicate the location of a servo sector and are used to distinguish the servo sector from the data sector. The reset mark is typically followed by a gap having no marks so that the reading device can confirm that the reading device head is located in a servo sector.

As can be seen, a storage medium typically includes data sectors and servo sectors. Data sectors are used to store data and servo sectors are important in accurately reading the data from the storage medium, however, there is a tradeoff between the amount of area of a storage medium used for data sectors and the amount of area used for servo sectors. It is desired to have the maximum amount of data on a storage medium; however, without enough servo sectors, the data sectors may not be read accurately. As such, servo marks can be viewed as storage media overhead. To maximize the data of a storage medium, the amount of servo mark area should be minimized, especially when applied to a high sample rate, high density storage medium. However, if too few servo marks are used, a reading device may not be able to accurately read the data marks from the storage medium.

As can be seen, as the density of information stored on a storage medium becomes greater, the issue of servo mark overhead becomes critical. Each servo mark decreases the amount of storage space available for data marks on the storage medium and a relatively long servo mark decreases the amount of data storage space even more. Long servo marks may cause a reading device to become unsynchronized within a servo sector and if this occurs, the reading device requires a predefined data resynchronization pattern that increases the overhead of retrieving data. Applying a conventional servo mark format to a high sample rate, high density storage medium may result in excessive servo mark overhead, thereby reducing the amount of storage available for data marks.

Further, to distinguish servo marks from data marks, servo marks are typically placed on the storage medium at one frequency and data marks are typically placed on the storage medium at another frequency. For example, data marks may be placed on the storage medium every five clock cycles and servo marks may be placed on the storage medium every fifteen clock cycles. This difference in spacing may be used by the reading device to differentiate between servo marks and data marks. A data clock cycle is used to read data marks and a servo clock cycle is used to read servo marks. If the ratio between the data clock and the servo clock are known, then the servo clock can be multiplied by a constant to derive the data clock. This provides a data clock, servo clock pair that are tightly coupled and therefore, should minimize read and write errors. However, when banded storage (i.e., the concentric tracks are divided into bands or zones) is implemented on a storage medium, data mark spacing varies with the particular zone. Therefore, multiplying the data clock by a constant does not provide a servo clock that functions for all zones.

In view of the above problems, there is a recognized need for a system and method for a storage format for a high bandwidth servo system. The present invention satisfies this need.

SUMMARY OF THE PRESENT INVENTION

The present invention is directed to a servo sector format for a high bandwidth, high sample rate servo system and a system and method for using the servo sector format.

According to an aspect of the present invention, a storage medium has a plurality of tracks and includes a plurality of data sectors and a plurality of servo sectors on each track. The number of servo sectors per track is greater than 200 servo sectors per track. Each servo sector includes a plurality of servo marks and a gap having no servo marks. The length of gap is less than 7 servo clock cycles.

According to another aspect of the present invention, a storage medium includes a plurality of tracks. Each track includes a plurality of data sectors and a plurality of servo sectors. The servo sectors do not have identical lengths. A first set of servo sectors has a first length and a second set of servo sectors has a second length. The first length is different from the second length. In particular, each servo sector has a synchronization gap. The length of the synchronization gap of the first servo sectors is different from the length of the synchronization gap of the second servo sectors. In one embodiment, the length of the servo gap of the first servo sector is less than seven servo cycles and the length of the servo gap of the second servo sector is about one servo cycle. The long synchronization gap allows an unsynchronized reading device to recognize a servo sector and synchronize. The short synchronization allows a synchronized reading device to remain synchronized and decreases servo overhead.

According to a further aspect of the present invention, each servo sector comprising a first location and a second location for a reset mark. If the reset mark is located in the first location the reset mark has a first value and if the reset mark is located in the second location the reset mark has a second value. The values of the reset marks represents a track number. In this manner, a track number can be encoded in the storage medium without requiring a dedicated servo sector field for the track number.

According to yet another aspect of the present invention, a disk drive includes a frequency generator that generates a first frequency for use in reading servo marks, a multiplying phase lock loop that multiplies the first frequency by a variable to derive a second frequency for use in reading data marks, and a reading device that uses the first frequency to read servo marks and the second frequency to read data marks. The variable is based on the location of the reading device, relative to zones of tracks of the storage medium.

According to another aspect of the present invention, a method is provided for aligning a reading device with a track of a storage medium. The method includes reading a first signal representing a location of a reading device with respect to a track, reading a second signal from a second set of wobble marks of a second servo sector, determining a third signal based upon the first and second signal, and repositioning the reading device based on the third signal.

According to yet another aspect of the present invention, a storage medium has a plurality of tracks and includes a first servo sector and an adjacent second servo sector. The first servo sector includes a first wobble bit, the center of the first wobble bit located proximate to a first track and a second wobble bit, the center of the second wobble bit located proximate to a second track, the second track adjacent to the first track, and the center of the second wobble bit offset circumferentially along the second track from the center of the first wobble bit. The second servo sector includes a third wobble bit, the center of the third wobble bit located between the first track and the second track, and a fourth wobble bit, the center of the fourth wobble bit located between the second track and a third track, the third track being adjacent to the second track.

These and further aspects of the present invention will be more fully discussed herein.

BRIEF DESCRIPTION OF THE DRAWINGS

The present invention is further described in the detailed description that follows, by reference to the noted plurality of drawings by way of non-limiting illustrative embodiments of the present invention, in which like reference numerals represent similar parts throughout the several views of the drawings, and wherein.

DETAILED DESCRIPTION OF THE ILLUSTRATIVE EMBODIMENTS

Figure 1:
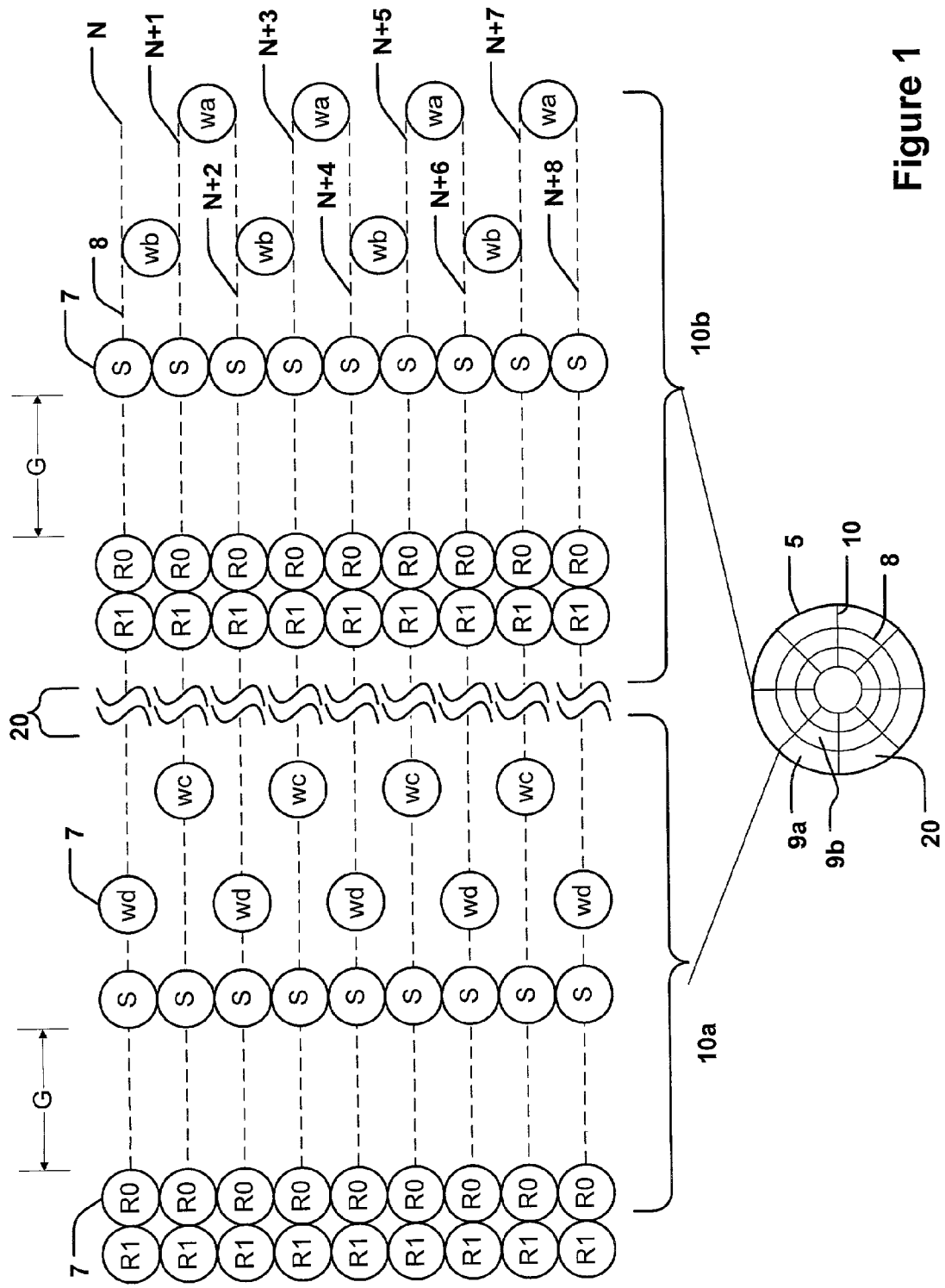
FIG. 1 is a an exploded view of servo marks of a storage medium, in accordance with one embodiment of the present invention.

The present invention is directed to a servo sector format for a high bandwidth servo system and a system and method for using the servo sector format.

Certain terminology may be used in the following description for convenience only and is not considered to be limiting. For example, the words "left", "right", "top", and "bottom" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

FIG. 1 is an exploded view of servo marks of a storage medium, in accordance with one embodiment of the present invention. As shown in FIG. 1, storage medium 5 includes a plurality of substantially concentric tracks 8 located at circumferentially spaced intervals on storage medium 5. Each track 8 includes a plurality of servo sectors 10 and a plurality of data sectors 20. Tracks 8 may be divided into zones 9, for example, an outermost zone 9a and a next outermost zone 9b, as shown. Data storage density may vary from zone to zone. Storage medium 5 may be a magnetic floppy disk, an optical disk, a near field optical disk, a magnetic hard disk, a magneto-optical disk, or the like.

Data sectors 20 include data marks (not shown) located along tracks 8 that store user data (not shown). Data marks may be an optical pit, an optical bump, a magnetically encoded bit, a magneto-optically encoded bit, or the like.

A reading device (not shown) is aligned with a track to read data from data sector 20. The reading device reads not only data, but also reads servo marks from servo sectors 10. The reading device uses the servo marks for position control and clocking speed control of the reading device. The reading device may also write data to data sectors 20; however, the reading device does not write to servo sectors 10 during normal operation.

Servo sectors 10 include servo marks 7 located along a track. In this embodiment, servo sectors 10 extend radially from an innermost track to an outermost track of storage medium 5.

A servo mark 7 may be a synchronization mark S, a reset mark R, a wobble mark W, an index mark I, or the like.

Synchronization mark S may be an optical pit, an optical bump, a magnetically encoded bit, or the like. In such a case, synchronization marks S are located substantially along radial lines of storage medium 5. Synchronization mark S may also be a continuous radial mark extending substantially radially along storage medium 5, rather than individual synchronization marks S.

ck by a synchronization gap G, Synchronization marks S are preceded on a tra which in turn is preceded by a reset mark R. That is, the reading device is typically stationary in the circumferential direction and storage medium 5 rotates past the reading device such that the reading device first encounters reset mark R, the synchronization gap G, and then synchronization mark S. Synchronization gap G includes no marks and is long enough to be a very uncommon pattern so that the synchronization gap G may be recognized by the reading device. This is particularly important when the reading device first synchronizes with the synchronization marks S and also when the reading device resynchronizes with the synchronization marks S.

In the present embodiment, synchronization gap G is less than 7 servo clock cycles. In another embodiment, synchronization gap G is less than four servo cycles. Synchronization gap G is greater than or equal to about one servo clock cycle.

In the present embodiment, there are greater than 200 servo sectors per track. In another embodiment of the present invention, there are greater than 1000 servo sectors per track and in yet another embodiment of the present invention, there are greater than 2000 servo sectors per track.

As shown in FIG. 1, storage medium 5 includes a plurality of tracks 8 numbered N through N+8. Each track includes a plurality of servo sectors 10 located circumferentially around storage medium 5; however, only servo sectors 10a and 10b in each of track numbers N through N+8 are enlarged to illustrate the details of servo sectors 10. As shown, each servo sector 10 includes a synchronization mark S. As described above, the synchronization marks S of each servo sector are located along a radial line of the storage medium 5. While tracks 8 are shown as straight lines in the exploded view of the servo sector, it should be appreciated that tracks 8 are actually concentric circles as shown in storage medium 5.

Servo sectors 10 are shown with the rotation of the storage medium 5 being counterclockwise, although the invention is not so limited. In this manner, the reading device first passes reset mark R, then synchronization gap G, then synchronization mark S, then wobble marks W of servo sector 10a, and then into data sector 20. After passing data sector 20, reading device then passes servo sector 10b. However, it is contemplated that in other embodiments of the present invention the rotation may be different and the particular configuration of servo marks 7 of the servo sector 10 may be altered.

Reset marks R indicate the beginning of a servo sector and are used to distinguish the servo sector 10 from the data sector 20. Reset mark R is typically followed by a synchronization gap G having no marks so that the reading device can confirm that it is located in a servo sector 10.

Wobble marks W are located after synchronization marks S. The reading device uses wobble marks W to stay aligned with a track, as described in more detail below. As shown in FIG. 1, wobble mark Wc is aligned with track number N+1 and wobble mark Wd is aligned with track number N+2. That is, wobble marks Wc and Wd are located with their centers proximate to track numbers N+1 and N+2, respectively. The center of Wc and center of Wd are offset from each other circumferentially along a track.

The reading device uses wobble marks W to stay aligned on a track by sensing wobble marks W and using the strength of the sensed signal to adjust its radial alignment. For example, if the reading device is perfectly aligned with track number N+1, the reading device will read equal amplitudes on both Wa and Wb and the difference signal (Wa−Wb) will be zero. In this case, reading device makes no correction to its radial position. If the reading device is misaligned slightly below track number N+1, reading device will read a higher signal form Wa than Wb and the difference signal (Wa−Wb) will be positive. In this case, reading device corrects its position relative to track number N+1 by moving radially outward (e.g., closer to track number N+1). Many techniques may be used to control the amount of movement of the reading device, such as, proportional control, servo control, proportional-integral-derivative control, feed-forward control, and the like.

If the reading device is located approximately equidistant between track number N+1 and track number N+2, then the signal strengths received from wobble marks are at a maximum or minimum and the rate of change of Wa−Wb is zero and is therefore not an acceptable signal for adjusting position. In this case, reading device cannot determine if it should move radially outward or radially inward with respect to storage medium 5.

To overcome this problem, servo sector 10b includes wobble mark Wc and wobble mark Wd. The center of wobble mark Wd is aligned with the center of track N and the center of wobble Wc is aligned with the center of track N+1. In this manner, if the reading device is located between track number N and track number N+1, then the reading device can determine if it should move radially outward or inward based on signals sensed from wobble mark Wc and Wd. For example, if the reading device is supposed to be aligned with track number N+1 and erroneously drifts to the midpoint between track number N and track number N+1 in servo sector 10b then the sensed signal from wobble marks Wa and Wb are at maximum or minimum and the reading device makes no correction yet. When the reading device passes into servo sector 10a the reading device senses wobble marks Wc and Wd and recognizes the fact that the zero signal indicates a half track off and wobble mark Wb is maximum and then servos downward. Similarly, if the reading device is supposed to aligned with track number N+1 and erroneously drifts to the midpoint between track number N+1 and track number N+2, then the sensed signal from wobble marks Wa−Wb is a maximum or a minimum and the reading device makes no correction yet. When the reading device passes into servo sector 10a the reading device senses wobble marks Wc−Wd and recognizes the fact the zero signal indicates a half track off and wobble mark Wa is maximum and then servos upward.

Importantly, wobble marks Wa, Wb, Wc, and Wd are not all located in one servo sector 10. Rather, wobble marks Wa and Wb are located in one servo sector (e.g., servo sector 10b) and wobble marks Wc and Wd are located in an adjacent servo sector (e.g., servo sector 10a). In this manner, the length of servo gap is minimized thereby allowing more servo gaps for locking to the servo PLL.

Figure 2:
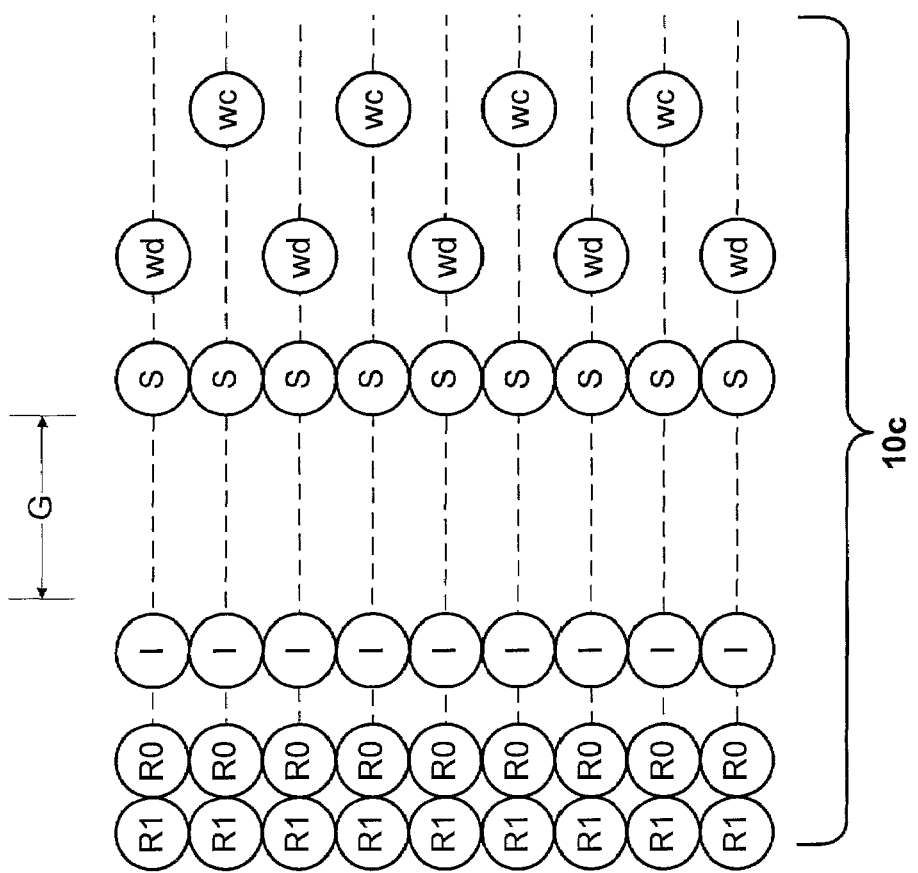
FIG. 2 is a diagram of servo marks of a storage medium, in accordance with another embodiment of the present invention.

FIG. 2 is a diagram of servo marks of a storage medium, in accordance with another embodiment of the present invention. In the present embodiment, servo sector 10c includes an index mark I.

Index mark I may be an optical pit, an optical bump, a magnetically encoded bit, or the like. In such a case, index marks I are located substantially along radial lines of storage medium 5. Index mark I may also be a continuous radial mark extending substantially radially along storage medium 5, rather than individual index marks I.

Index mark I indicates a circumferential position on storage medium 5. As such, only one servo sector per track typically includes an index mark I. Index marks may be used to indicate an angular position on a track. The reading device can determine that it is located at a specific angular position (e.g., zero degrees) when it detects the index mark. This can reduce recovery time if the reading device loses its angular position.

Index mark I may be positioned at various locations within servo mark 10c including after the synchronization mark S and after the wobble marks W as long as a detectable space is maintained from the Index mark to an adjacent mark.

Figure 3:
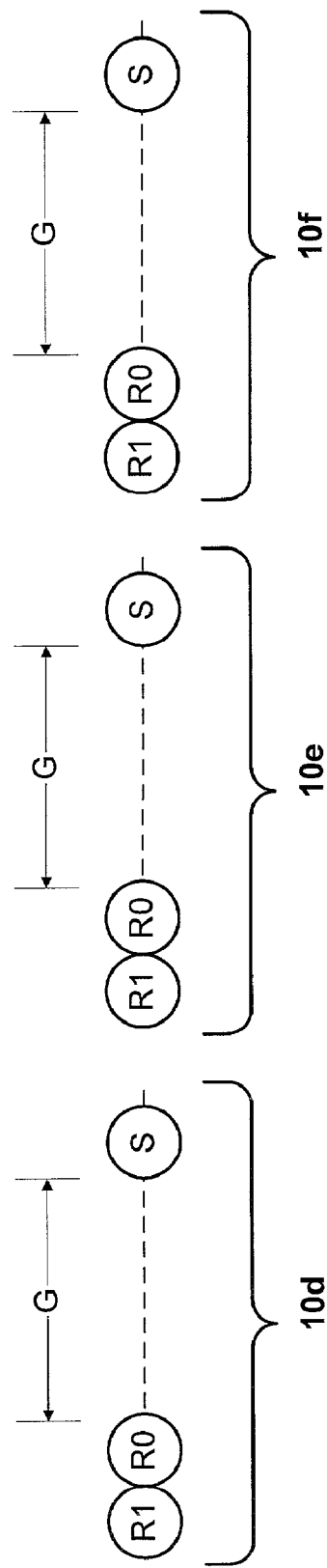
FIG. 3 is a diagram of servo marks of a storage medium illustrating a track number encoded in reset bits, in accordance with another embodiment of the present invention.

In another embodiment of the present invention, a track number is encoded in reset marks R. FIG. 3 is a diagram of servo marks of a storage medium illustrating a track number encoded in reset marks. As shown in FIG. 3, servo sector 10d includes a reset mark R that includes location R0 and R1. Either location R0 or location R1 is made. In this manner, the reset mark can represent a one or a zero. That is, if the mark in location R0 is made, the reset mark represents a zero, and if the mark in location R1 is made, the reset mark represents a one. The reset marks, over a plurality of servo sectors, are encoded to represents a track number. The beginning of the track number may be indicated by the index mark I, for example. While only three bits are shown (i.e., one bit in each of servo sectors 10d, 10e, and 10f), it is contemplated that the number of reset marks R in the track number may be expanded to support the number of tracks of the storage medium. In this manner, the reading device may determine the radial location of the reading device without having a long string of servo marks within a servo sector dedicated to representing the track number. The track number may be repeated N times per revolution where N represents the number of times the number of bits in the track number fits into the total servo sectors per revolution.

Figure 4:
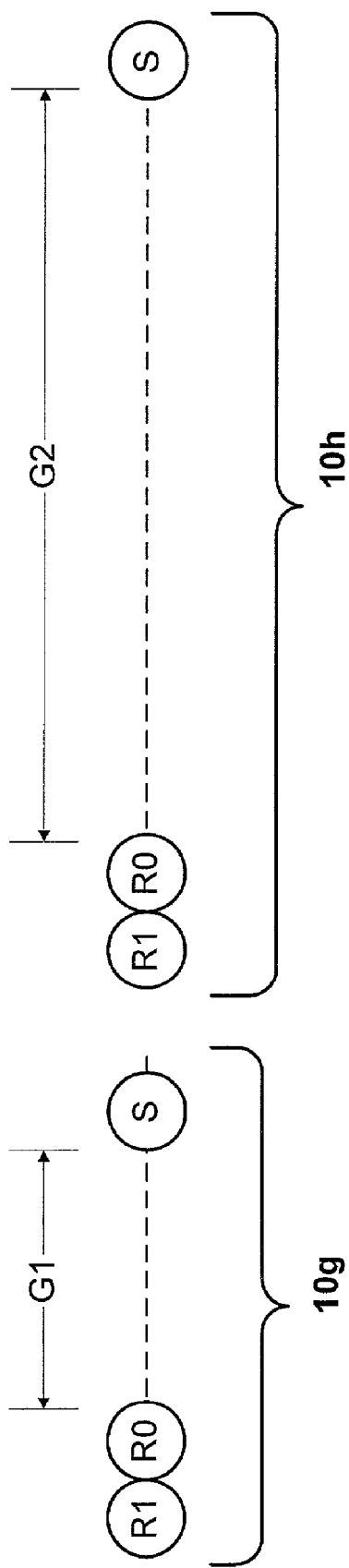
FIG. 4 is a diagram of servo marks of a storage medium illustrating two different length synchronization gaps, in accordance with another embodiment of the present invention.

In another embodiment, as shown in FIG. 4, synchronization gap G is a large gap for some servo sectors and a small gap for other servo sectors. As shown in FIG. 4, servo sector 10g includes a small synchronization gap G1 and servo sector 10h includes a large synchronization gap G2. A few servo sectors 10 having a large synchronization gap G2 may be regularly spaced about a track 9 and the remaining servo sectors 10 may include a small synchronization gap G1. For example, if 1200 servo sectors are located along a track, one hundred may have a large synchronization gap G2 and eleven hundred may have small a synchronization gap G1. A large synchronization gap G2 may be greater than four servo cycles and less than seven servo cycle. A small synchronization gap G1 may be less than three servo cycles or even one servo cycle. In this manner, an unsynchronized reading device may synchronize to a large synchronization gap G2 and then use small synchronization gaps G2 to confirm synchronization. Moreover, the small synchronization gap G1 reduces servo overhead, thereby allowing more data marks to be stored on a storage medium. The large synchronization gap G2 is used because it is easily recognized as being a highly improbable pattern in the midst of data.

Figure 5:
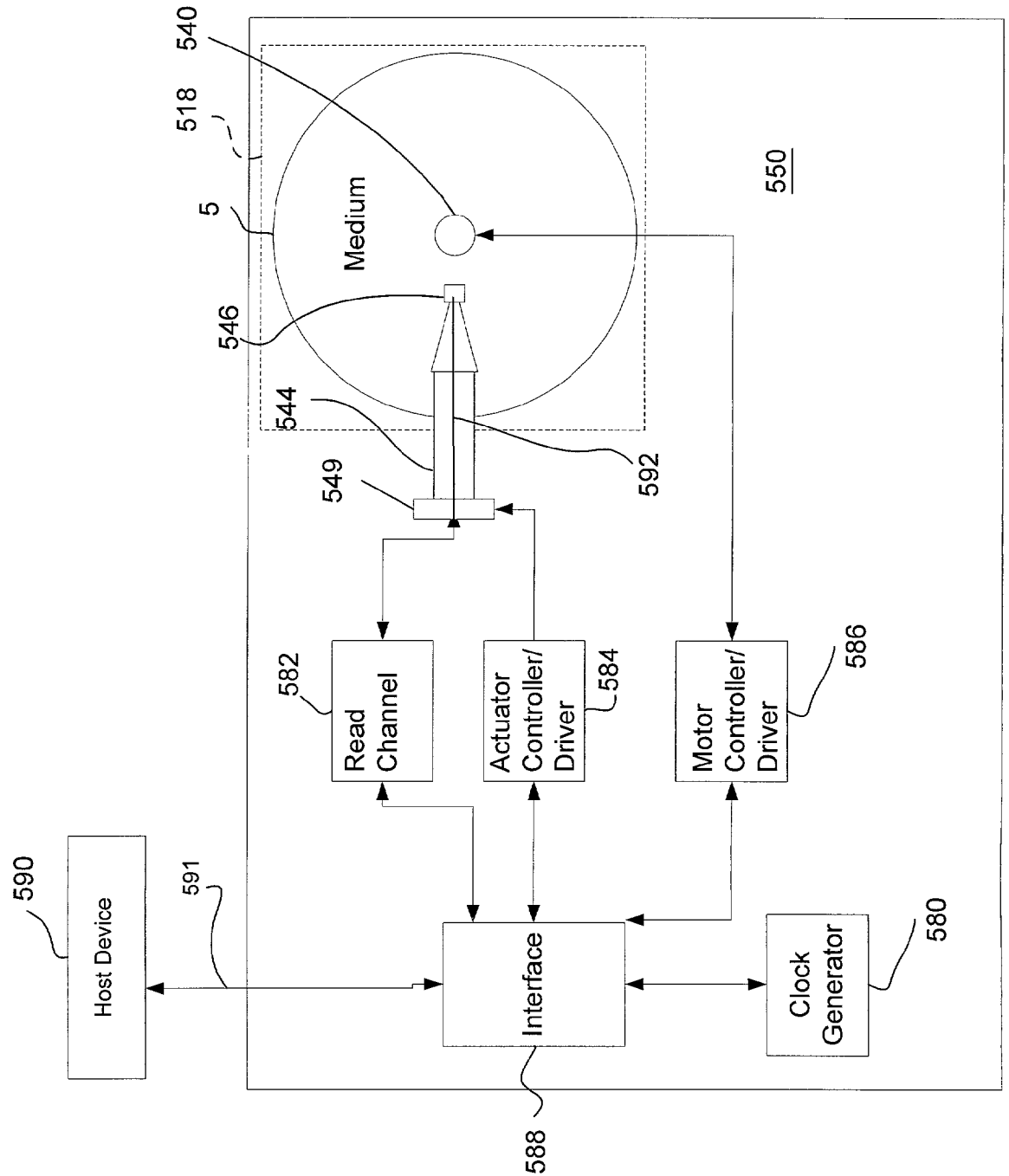
FIG. 5 is a schematic diagram of a reading device drive for storing and retrieving information for a host device, in accordance with another embodiment of the present invention.

Since the servo sector of the present invention is relatively short, in some cases as small as one servo cycle, an accurate clocking system is desired in the reading device to minimize reading and writing errors. FIG. 5 is a schematic diagram of a reading device drive for storing and retrieving information for a host device. Host device 590 may be one of a number of various types of computer based devices such as a personal computer, a handheld computer, or the like. Host device 590 communicates with drive 550 via bus 591 by sending commands to write or read digital information to or from storage medium 5. Bus 590 may be any one of the various buses such as parallel, generic serial, USB, fire wire, SCSI, and so on.

Storage medium 5 may be fixed in drive 550, or alternatively removable from drive 550. Where medium 5 is removable from drive 550, medium 5 may be encased in an outer shell 518 to protect medium 5 from damage.

Drive 550 comprises a controller 588 that provides an interface with host device 590 as well as controlling the overall operation of drive 550. Controller 588 is preferably a microprocessor-based controller. Drive 550 also comprises a read channel 582 for conditioning signals read from medium 5; actuator controller 584 for providing servo control and tracking; motor controller 586 for controlling the spin rate of medium 5 via a spindle motor 540, clock generator 580 for providing clocking control for reading and writing data sectors and servo sectors, and an actuator assembly for reading from medium 5.

The actuator assembly comprises a slider 546 that is connected to a distal end of an actuator assembly. Slider 546 carries the read write head element, either formed therein or attached thereto. The actuator assembly also comprises a suspension arm 544 and an actuator 549 that cooperate to move the slider 546 over the surface of medium 5 for reading and writing digital information. Read/write head 546 is electrically coupled to read channel 582 by way of electrical conductor 592.

Figure 6:
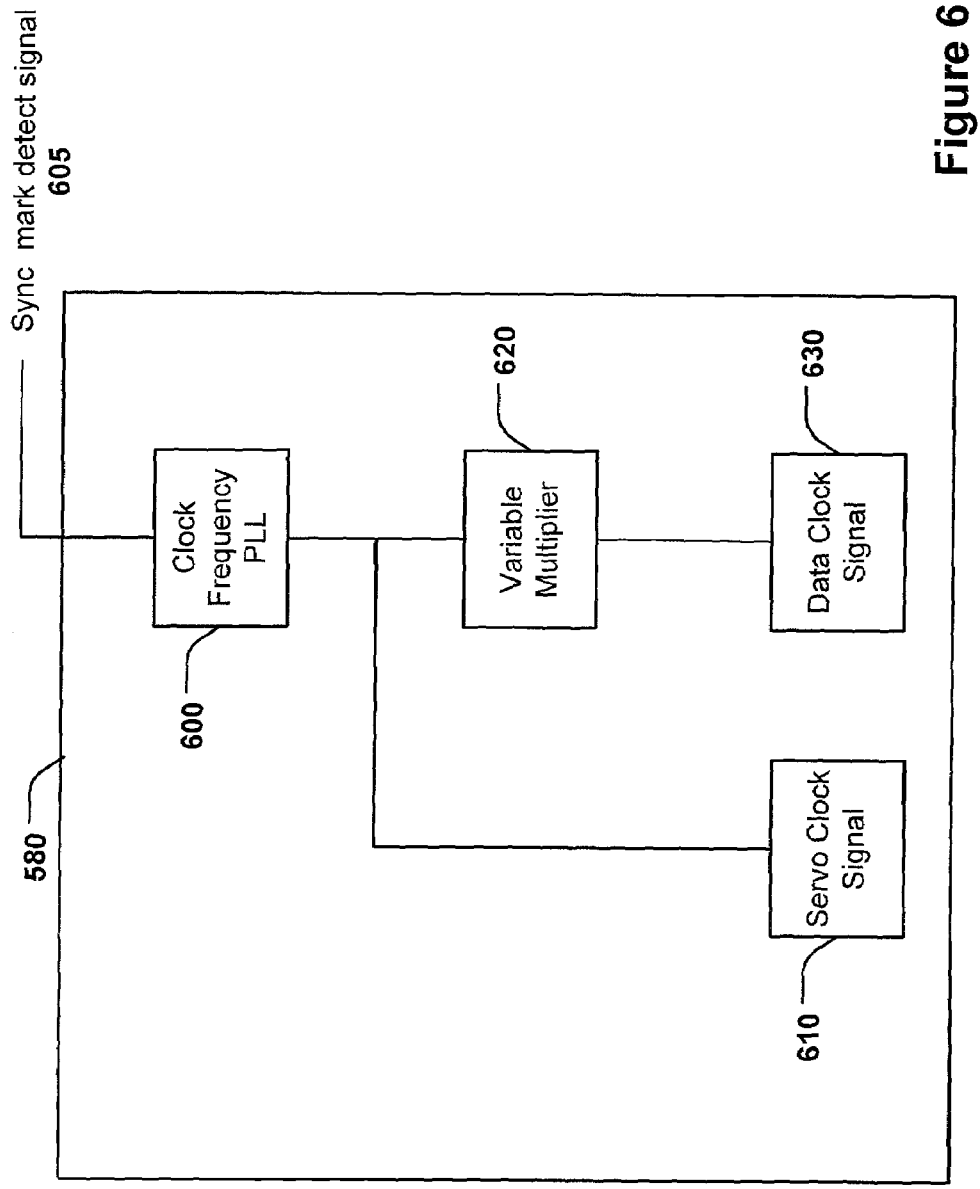
FIG. 6 is a block diagram of a clock generator circuit, in accordance with another embodiment of the present invention, for use in reading the servo marks of FIG. 1.

According to an embodiment of the present invention, an accurate clocking system is provided. FIG. 6 is a block diagram of clock generator 580 of FIG. 5. As shown in FIG. 6, clock phase lock loop 600 outputs a signal having a frequency. The frequency is derived from the sync mark detect signal 605 coming from the servo marks to give an appropriate servo clock frequency for detecting servo marks. The frequency is used by the reading device as the servo clock signal 610. Further, the frequency is multiplied by multiplier 620 to generate a second frequency used by the reading device as a data clock signal 630. In this manner, the second frequency may be a multiple of the first frequency allowing for accurate reading of the data sectors 20 and servo sectors 10. The second frequency is synchronous with disk rotation in that it is derived from the servo clock and therefore gives more accurate information about placement of data relative to storage medium rotation. Importantly, for a zoned storage medium, the multiple varies with the zone. The multiple may be stored in the electronics of the reading device. The proper multiple may be determined by reading the track number and selecting a corresponding multiple based on the track number. Preferably, the electronics of the reading device includes a table, or other method for converting from track number to the proper multiple.

This clocking system may be more accurate than a clocking system with two frequency generators. If servo clock signal 610 and data clock signal 630 were generated by different frequency generators, the frequency of the servo clock signal or the data clock signal may drift over time creating a non-optimal ratio of servo clock frequency to data clock frequency, which may in turn cause errors in reading or writing. Moreover, if the multiple were a constant, the electronic reading device could not read from a zoned storage medium. In a zoned storage medium, data marks are typically stored at a different density for each zone. Therefore, each zone has its own servo mark spacing to data mark spacing ratio, and thus requires a different servo clock frequency to data clock frequency ratio for each zone.

Figure 7:
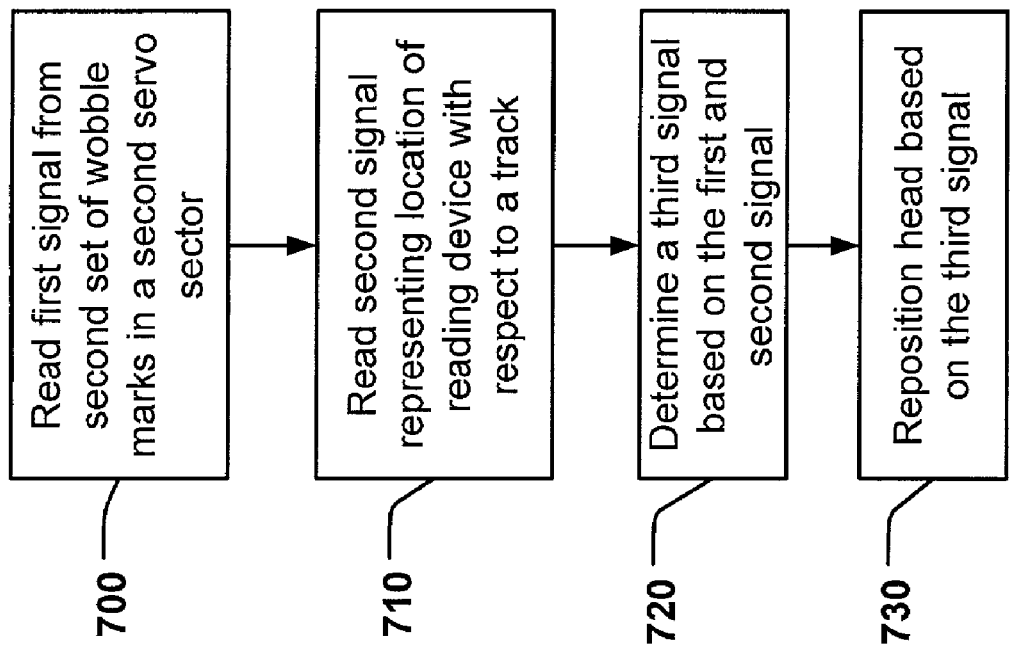
FIG. 7 is a flow diagram of a method in accordance with another embodiment of the present invention, illustrating using the servo marks of FIG. 1.

Also, to compensate for a wobble mark that may slightly vary in amplitude from an ideal amplitude, thereby giving error to the derived position signal on storage medium 5, the present invention contemplates averaging a plurality of wobble marks before repositioning the reading device. FIG. 7 is a flow diagram of a method in accordance with another embodiment of the present invention, of averaging a plurality of wobble marks before repositioning the reading device. As shown in FIG. 7, at step 700, reading device reads a signal from a first set of wobble marks located in a first servo sector. For example, reading device may read a signal from wobble mark Wc and wobble mark Wd in servo sector 10a of FIG. 1. Rather than immediately correcting the radial position of the reading device, the method proceeds to step 710.

At step 710, reading device reads a second signal representing a location of the reading device with respect to the track. For example, the reading device may read a stored signal read from wobble mark Wa and wobble mark Wb in servo sector 10b of FIG. 2. Alternatively, the reading device may read a stored averaged signal representing prior signals read from wobble marks, including a weighted average.

At step 720, a third signal is determined based on the first and second signals. According to one technique, the third signal is determined by averaging the first and second signal. In another technique, the third signal is derived by performing a weighted average of the first signal and the second signal. In yet another technique, most recent signals have the highest weight in the weighted average. For example, a weighted average may be performed by using a formula similar to new third signal=past averaged third signal+(1/N*present signal). N may be a number like ½ which trades off the need for faster response by being a small number versus the need for filtering errors out by being a large number.

At step 730, reading device uses the third signal to reposition the reading device. In the present embodiment, reading device inputs the averaged signal into a servo control system of the reading device. Also, reading device retains the signal from the second set of wobble marks for use in the next averaged reading. In this manner, the reading device implements a moving average for input to the servo control system of the reading device. Importantly, wobble marks from multiple servo sectors are used, thereby minimizing the size of the servo sectors and allowing more storage area for data marks. The method then reads another signal and determines another third signal.

It is noted that the foregoing examples have been provided merely for the purpose of explanation and are in no way to be construed as limiting of the present invention. While the invention has been described with reference to illustrative embodiments, it is understood that the words which have been used herein are words of description and illustration, rather than words of limitations. Further, although the invention has been described herein with reference to particular structures, materials, and embodiments, the invention is not intended to be limited to the particulars disclosed herein; rather, the invention extends to all structures and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A storage medium having a plurality of tracks, the storage medium comprising:

a plurality of data sectors on each track; and a plurality of servo sectors on each track, the number of servo sectors per track being greater than 200 servo sectors per track; each servo sector comprising a plurality of servo marks; and each servo sector having a gap, the gap having no servo marks, the length of gap being less than 7 servo clock cycles.

2. The storage medium of claim 1 wherein the number of servo sectors is greater than 1000 servo sectors per track.

3. The storage medium of claim 1 wherein the number of servo sectors is greater than 2000 servo sectors per track.

4. The storage medium of claim 1 wherein the length of the gap is less than 4 servo clock cycles.

5. A disk drive for reading data from a storage medium having a plurality of tracks divided into a plurality of zones, each track having a track number encoded into the track the disk drive comprising a read head for reading data along a track and the track number of each track, the disk drive comprising:

a phase lock loop frequency generator that generates a first frequency derived from locking a servo signal from the storage medium;

a multiplying phase locked loop that multiplies the first frequency by a variable to derive a second frequency for use in reading data marks, the variable based upon the track number read by the disk drive; and a reading device that uses the first frequency to read servo marks and the second frequency to read data marks.

* * * * *